United States Patent
Dhanjal et al.

(10) Patent No.: US 10,277,068 B2
(45) Date of Patent: Apr. 30, 2019

(54) ARCHITECTURE TO SCALE FINITE-STATE MACHINES ACROSS INTEGRATED CIRCUITS USING A DIGITAL BUS

(71) Applicant: Analog Devices Global, Hamilton (BM)

(72) Inventors: Navdeep Singh Dhanjal, San Jose, CA (US); Shengbing Zhou, Beijing (CN); Michael Edward Bradley, Limerick (IE); Hossain Opal, San Jose, CA (US); Douglas Chisholm, Edinburgh (GB); Clint Wolff, Westminster, CO (US)

(73) Assignee: Analog Devices Global, Hamilton (BM)

( * ) Notice: Subject to any disclaimer, the term of this patent is extended or adjusted under 35 U.S.C. 154(b) by 140 days.

(21) Appl. No.: 15/428,406

(22) Filed: Feb. 9, 2017

(65) Prior Publication Data

US 2017/0271917 A1    Sep. 21, 2017

Related U.S. Application Data

(60) Provisional application No. 62/310,148, filed on Mar. 18, 2016.

(51) Int. Cl.
| | | |
|---|---|---|
| *H02J 13/00* | (2006.01) | |
| *G06F 1/26* | (2006.01) | |
| *G06F 1/3296* | (2019.01) | |
| *H02J 3/00* | (2006.01) | |
| *H02J 1/10* | (2006.01) | |

(52) U.S. Cl.
CPC ............ *H02J 13/0062* (2013.01); *G06F 1/26* (2013.01); *G06F 1/263* (2013.01); *G06F 1/3296* (2013.01); *H02J 1/102* (2013.01); *H02J 3/005* (2013.01)

(58) Field of Classification Search
CPC . G06F 1/32; G06F 1/26; G06F 1/3296; G06F 1/263; H02J 13/0062; H02J 3/003; H02J 3/005; H02J 1/102
See application file for complete search history.

(56) References Cited

U.S. PATENT DOCUMENTS

2010/0169695 A1* 7/2010 Jurgilewicz ............... G06F 1/26
                                                                713/400

* cited by examiner

*Primary Examiner* — Robert Deberadinis
(74) *Attorney, Agent, or Firm* — Schwegman Lundberg & Woessner, P.A.

(57) ABSTRACT

A system comprises a plurality of power supplies, wherein a power supply provides a supply voltage rail to a voltage domain of the system; a plurality of power supply voltage sequencer devices electrically coupled to multiple power supplies of the plurality of power supplies, wherein a voltage sequencer device is configured to activate the multiple power supplies in a specified sequence; and a bus electrically coupled to the plurality of power supply voltage sequencer devices, wherein the bus is configured to communicate state information of the plurality of power supply voltage sequencer devices.

20 Claims, 8 Drawing Sheets

ARCHITECTURE TO SCALE FINITE-STATE MACHINES ACROSS INTEGRATED CIRCUITS USING A DIGITAL BUS

CLAIM OF PRIORITY

This application claims the benefit of priority under 35 U.S.C. § 119(e) to U.S. Provisional Patent Application Ser. No. 62/310,148, filed on Mar. 18, 2016, which is hereby incorporated by reference herein in its entirety.

BACKGROUND

Some electronic systems include multiple power supplies controlled by an integrated circuit. The supervisory circuit performs functions related to sequencing the power supplies for powering up or down and monitoring the power supplies. As the number of power supplies used on electronic systems such as servers or network communication boards continues to increase, it becomes a challenge to provide a cohesive power supply sequencing scheme to an electronic system overall.

OVERVIEW

This document relates generally to controlling the power supplies of electronic systems. A system example can include a plurality of power supplies, wherein a power supply can provide a supply voltage rail to a voltage domain of the system; a plurality of power supply voltage sequencer devices can be electrically coupled to multiple power supplies of the plurality of power supplies, wherein a voltage sequencer device can be configured to activate the multiple power supplies in a specified sequence; and a bus can be electrically coupled to the plurality of power supply voltage sequencer devices, wherein the bus can be configured to communicate state information of the plurality of power supply voltage sequencer devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Electronic systems can include multiple integrated circuit devices that require multiple voltage domains. The systems also include multiple power supplies to provide power supply voltage rails to the multiple voltage domains. These systems may have very strict voltage sequencing requirements, which are implemented using dedicated voltage sequence controllers. A sequence controller activates power supply voltage rails for specific voltage domains in a specified order.

Figure 1:
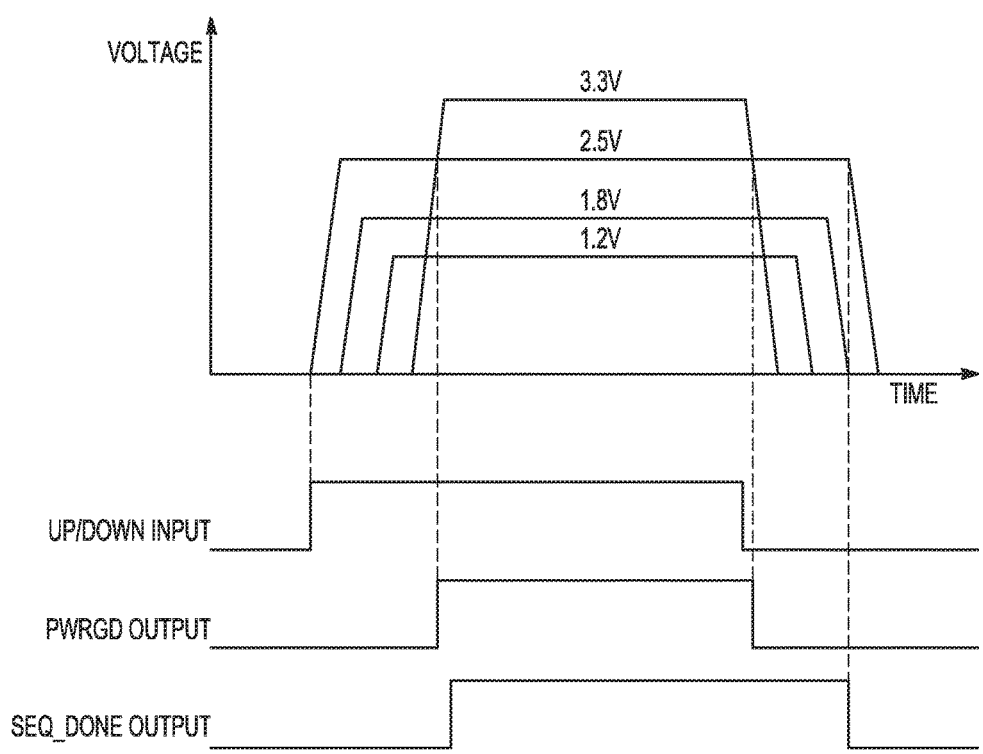
FIG. 1 is a timing diagram of an example of a power supply voltage sequencer device sequentially activating voltage domains.

FIG. 1 is a timing diagram of an example of a power supply voltage sequencer device sequentially activating voltage domains. The voltage sequencer controls and monitors power supplies that provide multiple voltages, such as voltages of 1.2 Volts (V), 1.8V, 2.5V, and 3.3V, for example. As shown in the timing diagram, the voltage sequencer activates the power supply rails in order of 2.5V, 1.8V, 1.2V, and 3.3V, and deactivates the power supply rails in reverse order. Electronic systems continue to incorporate more devices. For example, an electronic system such as a server or a networking board can include multiple integrated circuit devices of different types, such as application specific integrated circuits (ASICS), field programmable gate arrays (FPGAs) and processors. The number of voltage supply rails needed for such a system can vary from 20 to 200. A single sequence controller cannot meet the wide variety of number of rails required in different applications. For instance, some power supply rails controlled by a first sequence controller may need to be activated before power supply rails controlled by a second sequence controller, and some voltage supply rails of the first sequence controller may need to be activated after the power supply rails controlled by the second sequence controller. Conventional voltage sequence controllers may not be able to provide the flexibility desired when implementing the voltage domains of a large electronic system.

Figure 2:
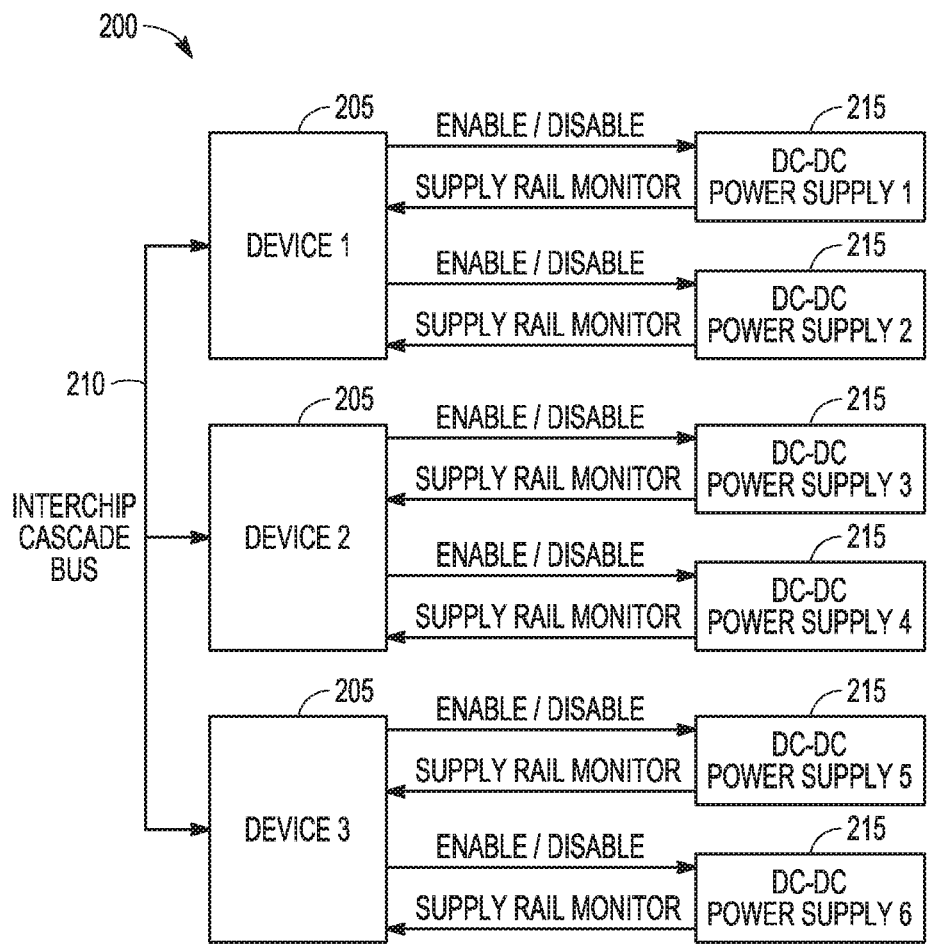
FIG. 2 is a block diagram of portions of an example of a voltage sequencer system.

FIG. 2 is a block diagram of portions of an example of a voltage sequencer system. The system 200 includes a number of individual voltage sequencers 205 and an inter-chip cascade bus (ICB) 210. Each voltage sequencer device includes control circuitry that controls multiple power supplies 215. The control circuitry may generate one or more control signals to activate and deactivate the power supplies. A control signal may have a specified voltage amplitude adequate to sufficiently turn on and turn off a specific power supply. Each voltage sequencer device includes monitoring circuitry to detect faults such as over-voltage faults and under-voltage faults in the power supplies. In certain examples, the power supplies are DC-DC power supplies. Only two power supplies are shown controlled by each voltage sequencer to simplify the example, although one voltage sequencer may actually control up to ten power supplies.

Each individual voltage sequencer may execute a finite state machine (FSM) to sequence the activation of the power supplies it controls and monitors. A voltage sequencer can include logic circuitry to implement the FSM in each device. The logic circuitry can include hardware circuitry or can be implemented in firmware. The logic circuitry sequentially steps through a fixed series of steps to sequence the device through the different states to perform the functions described. Using logic circuitry instead of a processor simplifies the design of the overall system. A voltage sequencer also includes a bus interface to connect to the ICB. The ICB provides control over the state machines of the voltage sequencers. One or more of the individual state machines may be interrupted and held while one or more of the other individual state machines are allowed to advance. In this way, the ICB provides for the individual voltage sequencers to be connected and combined to form an overall scalable FSM for the system 200. In some examples, the ICB is implemented as an inter-integrated circuit (I²C) bus.

Figure 3:
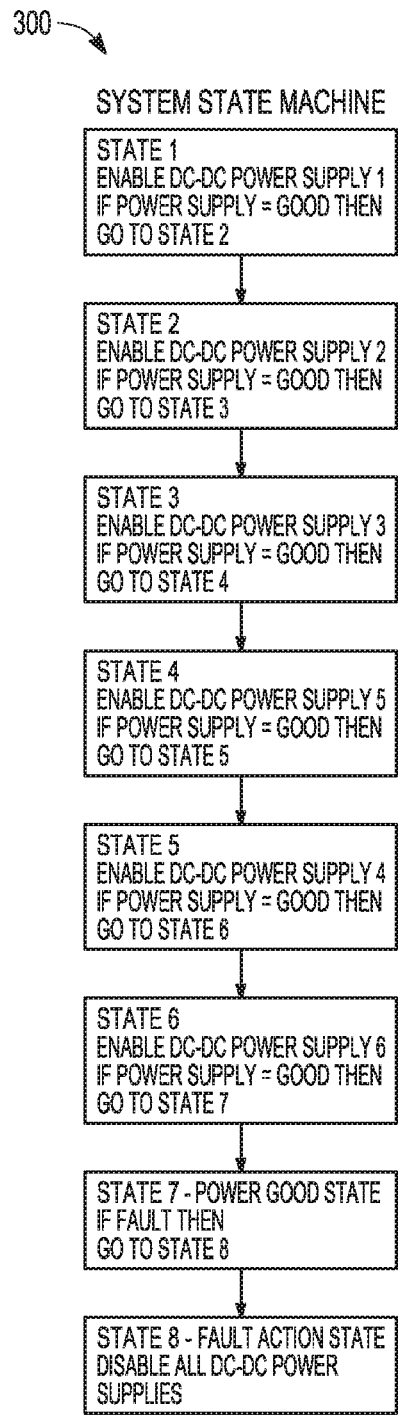
FIG. 3 is a state diagram of an example of a state machine for activating power supplies of an electronic system.

FIG. 3 is a state diagram of an example of a state machine 300 for activating power supplies of an electronic system. The implementation of the state machine with voltage sequencers is not shown. In this example, there are eight States included in the state machine 300. State One through State Six activate six power supplies in order of 1-3, 5, 4, and 6. State Seven corresponds to activation of all 6 power supplies being successful, and monitoring for a fault in the power supplies. If there is a fault, the power supplies are disabled in State Eight. Only eight states and six power supplies are used in the example for simplicity. As explained previously, an actual system may include from 20 to 200 power supplies.

Figure 4:
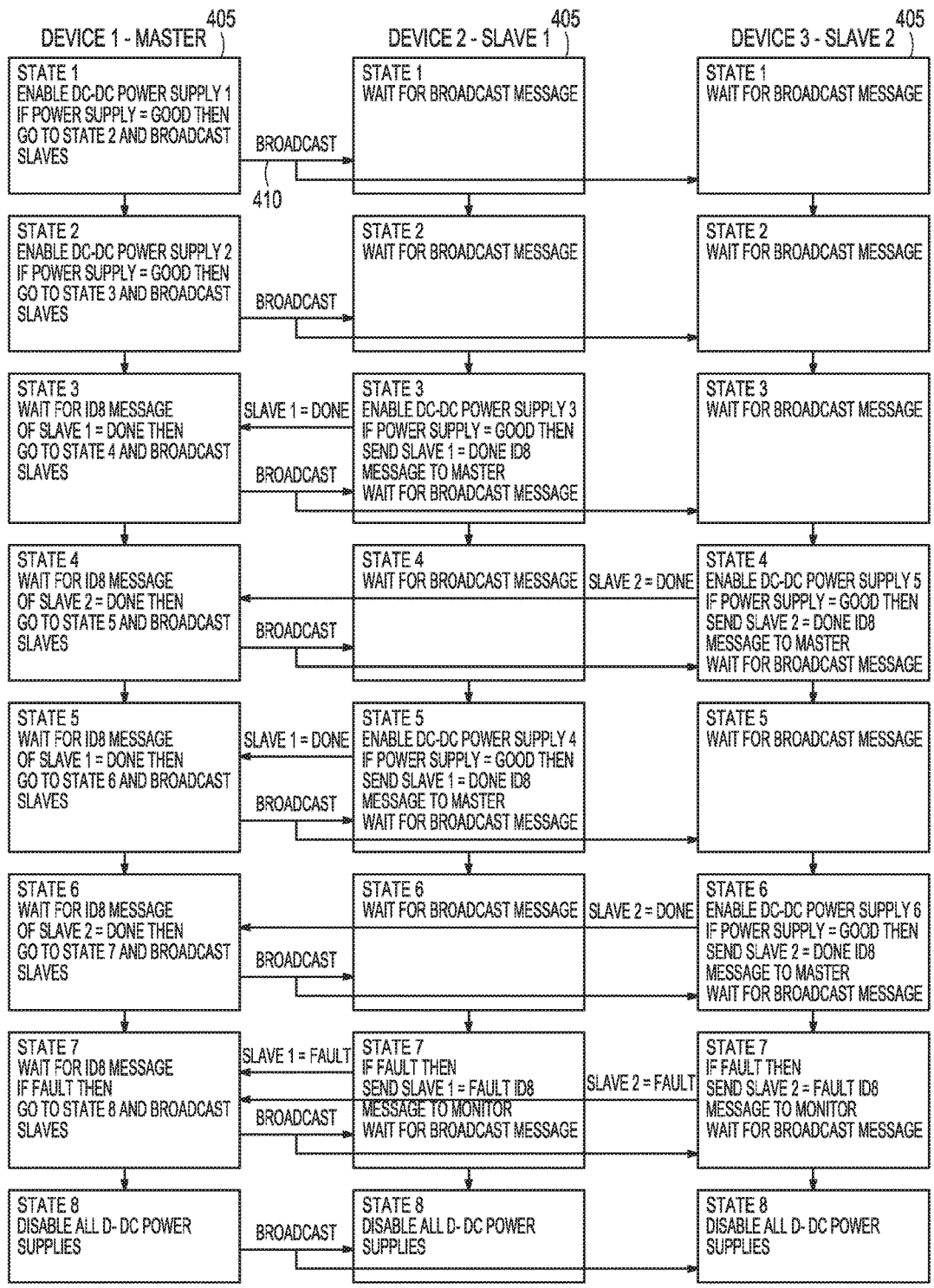
FIG. 4 shows an implementation of the state machine of FIG. 3 using the voltage sequencer system of FIG. 2.

FIG. 4 shows an implementation of the state machine of FIG. 3 using the voltage sequencer system of FIG. 2. The three voltage sequencer devices 405 are each coupled to an ICB 410 and to two power supplies. One device is configured (e.g., by programming) as the Master device and the other devices are configured as Slave devices. Each voltage sequencer device progresses through the same number of finite states, and the number of states is the same as in the overall system state machine of FIG. 3. The Master device controls the state of each of the Slave devices by broadcasting the State to which state the Slave devices should go over the ICB. All of the Slave devices go to the same finite state as the Master device. The Slave devices communicate status back to the Master device.

In State One, the Master device activates Power Supply 1. The Slave devices are also in State One and are waiting for a message from the Master device broadcast over the ICB. If Power Supply 1 is successfully activated, the Master device progresses to State Two and broadcasts a message to the Slave Devices over the ICB that they should progress to State Two. In State Two, if Power Supply 2 is successfully activated by the Master device, the Master device progresses to State Three and broadcasts a message to the Slave Devices over the ICB to progress their states to State Three.

In State Three, Slave device 1 activates Power Supply 3 to which it is connected. Slave device 2 waits for a broadcast message. The Master device is also waiting to receive status from Slave device 1 over the ICB. If Power Supply 3 is successfully activated, Slave Device 1 sends status of the activation to the Master device over the ICB. The Master device broadcasts a message to the Slave Devices over the ICB that they should progress to State Four. In State Four, Slave device 2 activates Power Supply 5 to which it is connected. Slave device 1 waits for a broadcast message. If Power Supply 5 is successfully activated, Slave Device 2 sends status of the activation to the Master device over the ICB. The Master device broadcasts a message to the Slave Devices over the ICB that they should progress to State Five.

In State Five, Slave device 1 activates Power Supply 4 to which it is connected. Slave device 2 waits for a broadcast message. If Power Supply 4 is successfully activated, Slave Device 1 sends status of the activation to the Master device over the ICB. The Master device broadcasts a message to the Slave Devices over the ICB that they should progress to State Six. In State Six, Slave device 2 activates Power Supply 6 to which it is connected. Slave device 1 waits for a broadcast message. If Power Supply 6 is successfully activated, Slave Device 2 sends status of the activation to the Master device over the ICB. The Master device broadcasts a message to the Slave Devices via the ICB that they should progress to State Seven.

In State Seven, all of the power supplies have been successfully activated, and the power supplies are monitored for a power supply fault. If the Master device detects a fault, it broadcasts a message to the Slave Devices over the ICB that they should progress to State Eight in which the power supplies are disabled. If a Slave devices detects a fault, it sends status to the Master device which then broadcasts the message to progress to State Eight. In the Example of FIG. 4, any fault causes the Master device to initiate disabling of all the power supplies. In certain examples, the power supplies are shut down in the reverse order that they were activated. In some examples, the Master device may initiate a retry of activation of the power supply indicating the fault. If activation is unsuccessful, the power supplies are deactivated.

Figure 5:
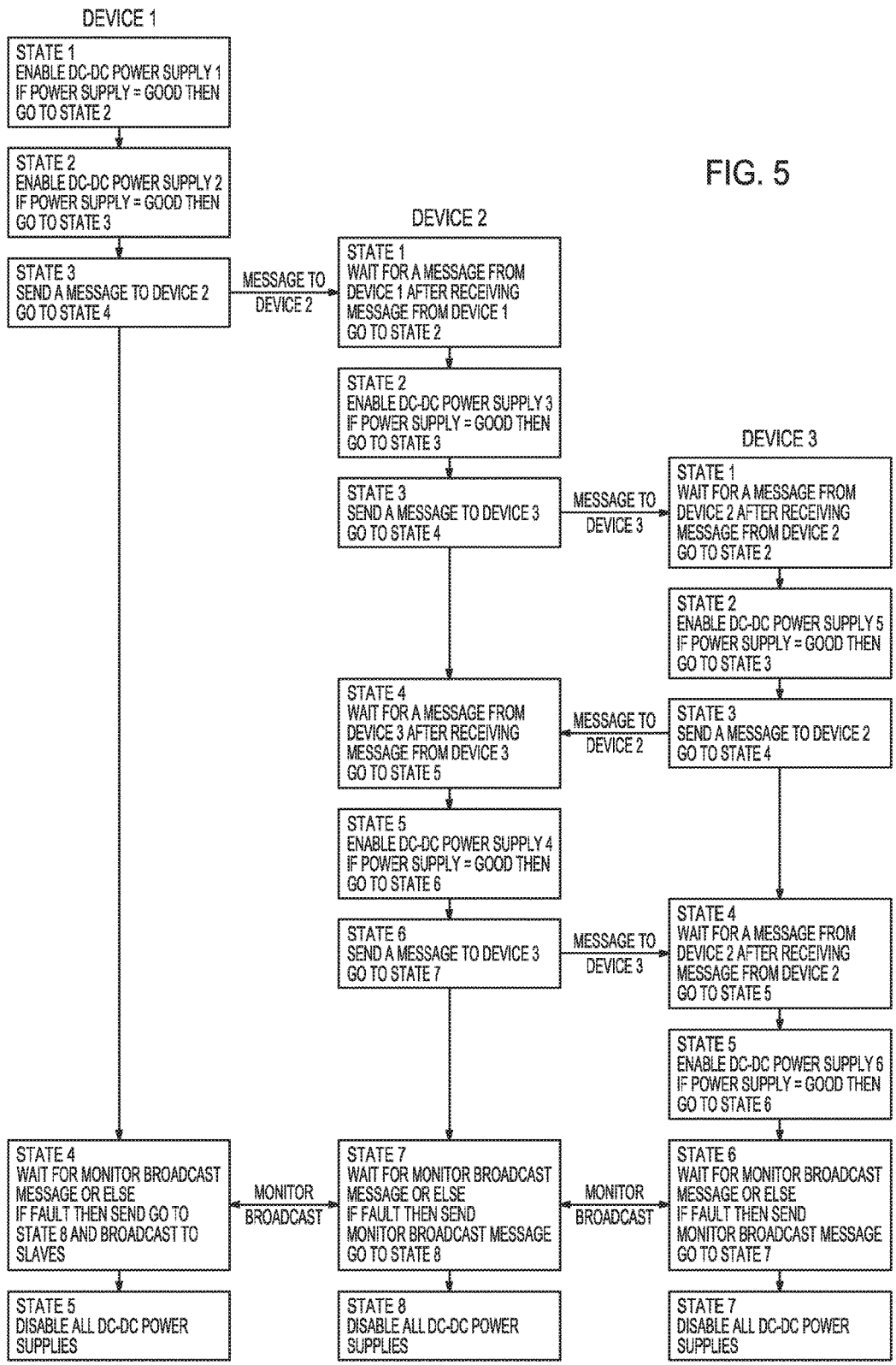
FIG. 5 shows an example of another state machine implemented with the voltage sequencer system of FIG. 2.

FIG. 5 shows an example of another state machine that performs the functions of the state machine of FIG. 3 using the voltage sequencer system of FIG. 2. The three voltage sequencer devices (Device 1, Device 2 and Device 3) are each coupled to an ICB and to two power supplies as shown in FIG. 2. However, in this example each voltage sequencer device progresses through a different set of finite states. The voltage sequencer devices may communicate using a ping-pong type communication mechanism using the ICB. Only one device progresses through its states at a time. When that device is done, it sends a message over the ICB that another device may begin to sequence through its states. This can be viewed as each of the devices having a turn as the Master device. In the case where a device transitions to a critical state (e.g., a power supply connected to the device indicates a fault), the device will broadcast a message on the ICB. In response to the broadcast of the message, all other devices may transition to the same critical state.

The state machine example of FIG. 5 begins with Device 1 in State One. In State One, Device 1 activates Power Supply 1. The other devices may also be in their State One in which they are waiting for a message via the ICB from another device. If Power Supply 1 is successfully activated, Device 1 progresses to State Two. It does not send a message that it has progressed or is progressing to a new state. In State Two of Device 1, if Power Supply 2 is successfully activated, Device 1 progresses to State Three and sends a message to Device 2 over the ICB that Device 2 may begin to sequence through its states. Device 1 may then proceed to its State Four in which it waits for a broadcast message to take any action, and monitors the status of the Power Supplies that it sequences. At this point, State One and State Two of the state machine of FIG. 3 are completed.

In State One of Device 2, Device 2 waits for a message that from Device 1 that it can proceed to its next state. When it receives the message it proceeds to its State Two. In State Two of Device 2, Device 2 activates Power Supply 3. If Power Supply 3 is successfully activated, Device 2 progresses to its State Three in which Device 2 sends a message to Device 3 via the ICB that Device 3 may begin to sequence through its states. Device 2 may then proceed to its State Four in which it waits for a message to resume sequencing through its states. At this point, State Three of FIG. 3 is completed.

In State One of Device 3, Device 3 waits for a message that from Device 2 that it can proceed to its next state. When it receives the message it proceeds to its State Two. In State Two of Device 3, Device 3 activates Power Supply 5. If Power Supply 5 is successfully activated, Device 3 progresses to its State Three in which Device 3 sends a message to Device 2 via the ICB that Device 2 may resume sequencing through its states. Device 3 may then proceed to its State Four in which it waits for a message to resume sequencing through its states. At this point, State Four of FIG. 3 is completed.

When Device 2 is in its State Four and receives a message from Device 3 to resume sequencing, Device 2 proceeds its State Five in which Power Supply 4 is activated. If Power Supply 5 is successfully activated, Device 2 progresses to its State Six in which Device 2 sends a message to Device 3 via the ICB that Device 3 may resume sequencing through its states. Device 2 may then proceed to its State Seven in which it waits for a broadcast message to take any action, and monitors the status of the Power Supplies 3 and 4. At this point, State Five of FIG. 3 is completed.

When Device 3 is in its State Four and receives a message from Device 2 to resume sequencing, Device 3 proceeds its State Five in which Power Supply 6 is activated. If Power Supply 6 is successfully activated. Device 3 progresses to its State Six. In State six of Device 3, Device 3 waits for a broadcast message to take any action, and monitors the status of the Power Supplies 5 and 6. At this point, State Six of FIG. 3 is completed.

Although each of the devices in a different finite state of its state machine (Device 1 in State Four, Device 2 in State Seven, and Device 3 in State Six), all the Power Supplies are activated and the devices are monitoring for a fault. This corresponds to State Seven of FIG. 3 ("Power Good" State). If any of the devices detects a fault, it broadcasts a message to the other devices and proceeds to its next state in which it disables the power supplies to which it is connected. In response to the broadcast message, the other device also sequence to their next state in which it disables the power supplies. This corresponds to State Eight of FIG. 3 ("Fault Action" State).

The devices and supporting signals of the state machine of the examples in FIGS. 4 and 5 can be scaled to a system of a larger number of voltage sequencer devices and power supplies. Configuring a large number of Power Supplies for an electronic system can be complicated.

Figure 6:
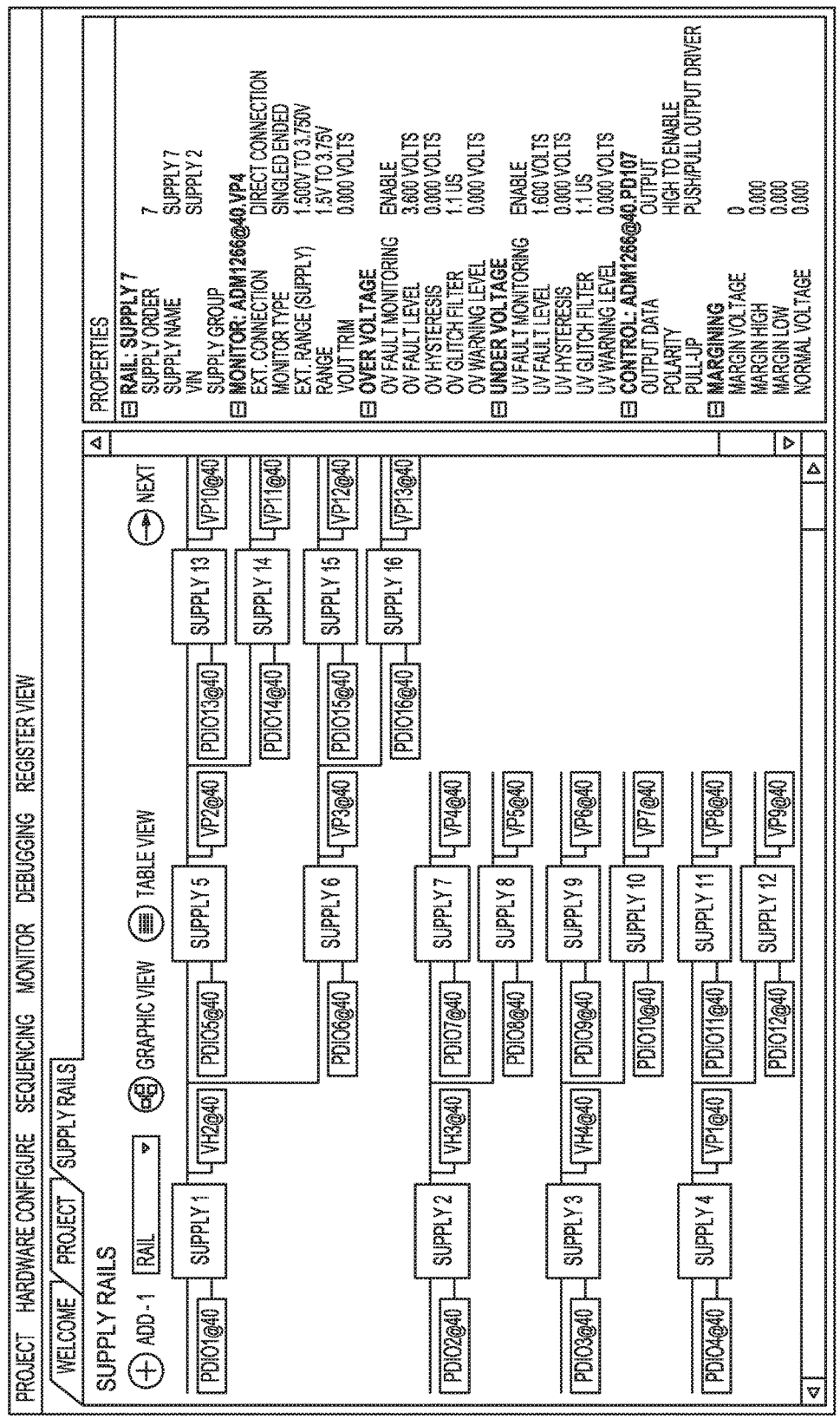
FIGS. 6-8 are examples of a graphical user interface (GUI) used to configure power supply voltage sequencer devices.
Figure 7:
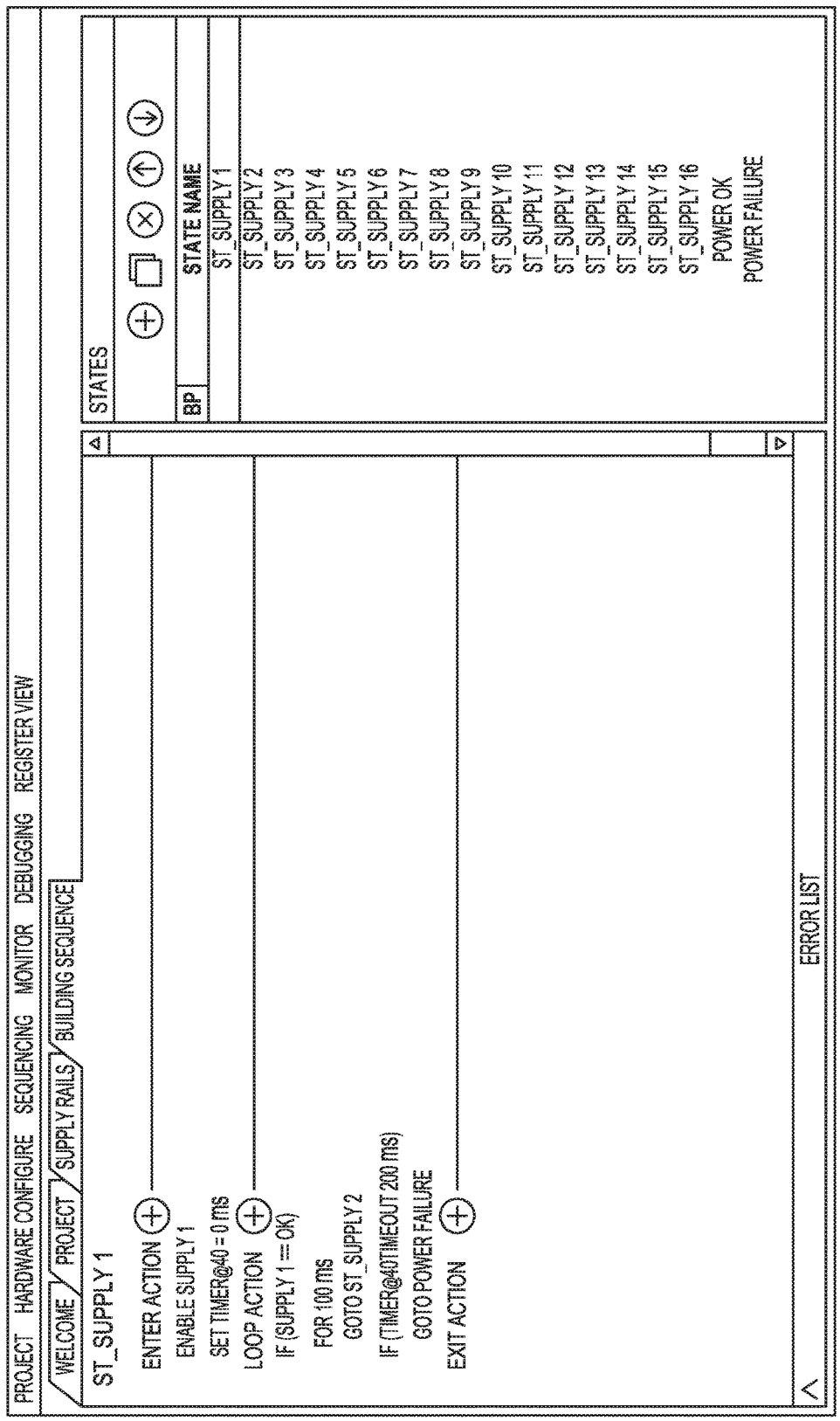
Figure 8:
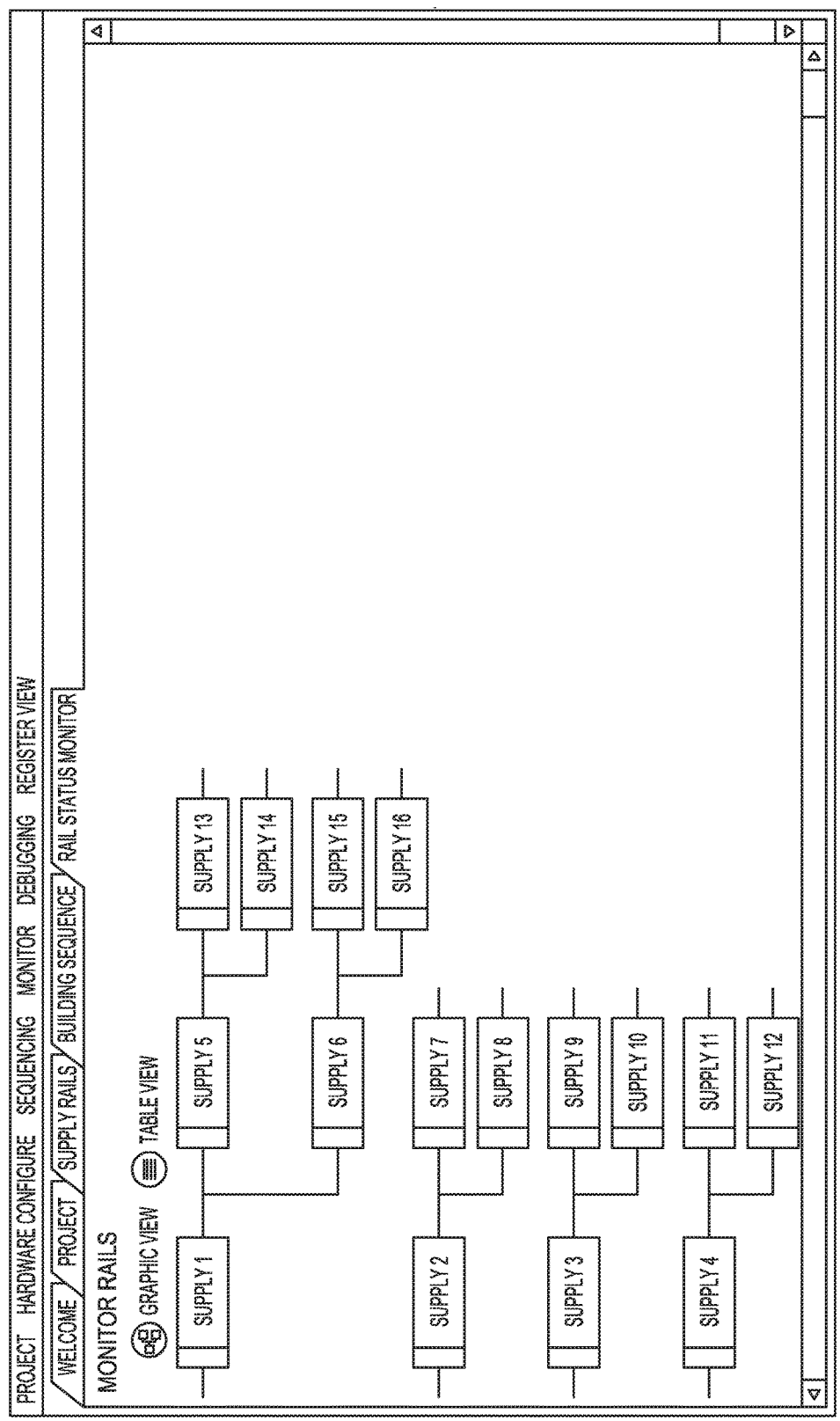

FIGS. 6-8 are examples of a graphical user interface (GUI) used to configure voltage sequencer devices for sixteen Power Supplies. The Power Supplies may provide sixteen voltage domains for an electronic system. The GUI may be displayed by a client application that configures the voltage sequencer devices. The client may use a host computing system to communicate with the voltage sequencer devices. The Power Supplies may be numbered in order of their activation. FIG. 6 shows how Power Supplies can be nested. For instance, a voltage sequencer device may control and monitor Power Supplies 1, 5, 6, and 13-16. Power Supplies 15 and 16 may be activated if activation of Power Supply 6 is successful and after Power Supplies 13 and 14 are activated. In FIG. 6, Power Supply 7 is selected and the Properties associated with Power Supply 7 are listed in the window to the right in FIG. 6. The Properties include, among other things, the input (Vin) to Power Supply 7 is Power Supply 2, its power supply operating range, and its over voltage fault detection level, and its under voltage detection fault detection level.

FIG. 7 is an example of using the GUI to set the logic for a specific state of the system. The example shows the conditions for sequencing the activation of Power Supply 1 to Power Supply 2. FIG. 8 is an example of using the GUI to monitor the operating status of the supply rails. The operating status is provided by the voltage sequencer devices. The GUI may show the activation of the Power Supplies and may show any fault status of any of the Power Supplies.

The GUI can be used to configure the individual voltage sequencer devices into an overall FSM to provide cohesive power supply sequencing that activates the voltage domains of the electronic system.

ADDITIONAL DESCRIPTION AND EXAMPLES

Example 1 can include subject matter (such as a system) comprising a plurality of power supplies, wherein a power supply provides a supply voltage rail to a voltage domain of the system; a plurality of power supply voltage sequencer devices, respectively electrically coupled to multiple power supplies of the plurality of power supplies, wherein an individual voltage sequencer device is configured to activate the multiple power supplies in a specified sequence; and a bus electrically coupled to the plurality of power supply voltage sequencer devices, wherein the bus is configured to communicate state information of the plurality of power supply voltage sequencer devices to coordinate activation of the power supplies.

In Example 2, the subject matter of Example 1, optionally includes the plurality of power supply voltage sequencer devices includes a master device and one or more slave devices, wherein the plurality of power supply voltage sequencer devices sequence through multiple device states to activate the plurality of power supply devices, and wherein the master device is configured to broadcast a device state to the one or more slave devices via the bus to place all of the voltage sequencer devices in the same device state.

In Example 3, the subject matter of Example 2 optionally includes one more slave devices configured to send fault status information to the master device, and the master device broadcasts a device state to the one or more slave devices according to the received fault status information.

In Example 4, the subject matter of one or any combination of Examples 1-3 optionally includes the power supply voltage sequencer devices each including a finite state machine that sequences the power supply voltage sequencer device through multiple device states to activate the multiple power supply devices to which it is electrically coupled, wherein only one voltage sequencer device sequences through device states at a time and communicates status of the sequencing to the other power supply voltage sequencer devices via the bus.

In Example 5, the subject matter of one or any combination of Examples 1-4 optionally includes a power supply voltage sequencer device that broadcasts fault status information to the other the power supply voltage sequencer devices, and the power supply voltage sequencer devices change device state according to received fault status information.

In Example 6, the subject matter of one or any combination of Examples 1-5 optionally includes each of the power supply voltage sequencer devices including a finite state machine, wherein the finite state machine is implemented as logic circuitry.

In Example 7, the subject matter of one or any combination of Examples 1-6 optionally includes a graphical user interface (GUI) and a processor, wherein each of the power supply voltage sequencer devices includes a finite state machine, wherein the processor is configured to program device states of the finite state machine in the plurality of power supply voltage sequencer devices using information received using the GUI.

In Example 8, the subject matter of Example 7 optionally includes a processor configured to program power supply operating properties in the plurality of power supply voltage sequencer devices using information received using the GUI.

In Example 9, the subject matter of one or both of Examples 7 and 8 optionally includes a processor configured to receive operating status information from the plurality of power supply voltage sequencer devices and display operating status of power supply voltage rails using the GUI.

In Example 10, the subject matter of one or any combination of Examples 1-9 optionally includes the bus being an inter-integrated circuit ($I^2C$) bus.

Example 11 includes subject matter (such as an integrated circuit), or can optionally be combined with the subject matter of one or any combination of Examples 1-10 to include such subject matter, comprising, control circuitry configured to activate and deactivate multiple power supplies; a bus interface; and logic circuitry configurable via the bus interface as a finite state machine to generate control signals to sequentially activate and deactivate the multiple power supplies.

In Example 12, the subject matter of Example 11 optionally includes logic circuitry configured to communicate state information of the finite state machine via the bus interface.

In Example 13 the subject matter of one or both of Examples 11 and 12 optionally includes monitoring circuitry configured to monitor the operating status of the multiple power supplies and communicate operating status information via the bus interface.

In Example 14, the subject matter of one or any combination of Examples 11-13 optionally includes the bus interface being an inter-integrated circuit ($I^2C$) bus interface.

Example 15 can include subject matter (such as a method of operating an ambulatory medical device, a means for performing acts, or a computer-readable medium including instructions that, when performed by processing circuitry of a computing device, cause the computing device to perform acts), or can optionally be combined with one or any combination of Examples 1-14 to include such subject matter, comprising implementing a graphical user interface (GUI) on the computing device; receiving power supply voltage sequencer information via the GUI; and configuring, using the power supply voltage sequencer information, a plurality of power supply voltage sequencer devices to coordinate activation of a plurality of power supplies in a specified sequence, wherein a power supply provides a supply voltage rail to a voltage domain of an electronic system, and wherein a power supply voltage sequencer controls activation of more than one power supply.

In Example 16, the subject matter of Example 15 optionally includes configuring a state machine in each of the power supply voltage sequencer devices, wherein a power supply voltage sequencer device sequentially activates and deactivates power supplies to which it is connected according to the configured state machine; and configuring a power supply voltage sequencer device as a master device and one or more other power supply voltage sequencer devices as slave devices, wherein the master device is configured to broadcast a device state to the one or more slave devices to place all of the voltage sequencer devices in the same device state.

In Example 17, the subject matter of one or both of Examples 15 and 16 optionally include configuring a state machine in each of the power supply voltage sequencer devices, wherein a power supply voltage sequencer device sequentially activates and deactivates power supplies to which it is connected according to the configured state machine, wherein only one voltage sequencer device sequences through device states at a time and communicates status of the sequencing to the other power supply voltage sequencer devices.

In Example 18, the subject matter of one or any combination of Examples 15-17 optionally includes receiving power supply operating properties via the GUI and program the plurality of power supply voltage sequencer devices using the received power supply operating properties.

In Example 19, the subject matter of one or any combination of Examples 15-18 optionally includes receiving operating status information from the plurality of power supply voltage sequencer devices and display operating status of power supply voltage rails using the GUI.

In Example 20, the subject matter of one or any combination of Examples 15-19 optionally includes sending configuration information to a power supply voltage sequencer device and receive operating status information from the power supply voltage sequencer device according to an inter-integrated circuit ($I^2C$) bus protocol.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A power supply management system, the system comprising:
   a plurality of power supplies, wherein a power supply provides a supply voltage rail to a voltage domain of the system;
   a plurality of power supply voltage sequencer devices, respectively electrically coupled to multiple power supplies of the plurality of power supplies, wherein each individual voltage sequencer device is configured to activate the multiple power supplies in a specified device state sequence; and
   a bus electrically coupled to the plurality of power supply voltage sequencer devices, wherein one or more voltage sequencer devices are configured to communicate a device state via the bus to progress activation of the plurality of power supplies.

2. The system of claim 1, wherein the plurality of power supply voltage sequencer devices includes a master device and one or more slave devices, wherein the plurality of power supply voltage sequencer devices sequence through multiple device states to activate the plurality of power supply devices, and wherein the master device is configured to broadcast a device state to the one or more slave devices via the bus to place all of the voltage sequencer devices in the same device state.

3. The system of claim 2, wherein the one more slave devices are configured to send fault status information to the master device, and the master device broadcasts a device state to the one or more slave devices according to the received fault status information.

4. The system of claim 1, wherein each of the power supply voltage sequencer devices includes a finite state machine that sequences the power supply voltage sequencer device through multiple device states to activate the multiple power supply devices to which it is electrically coupled, wherein only one voltage sequencer device sequences through device states at a time and communicates status of the sequencing to the other power supply voltage sequencer devices via the bus.

5. The system of claim 4, wherein a power supply voltage sequencer device broadcasts fault status information to the other the power supply voltage sequencer devices, and the power supply voltage sequencer devices change device state according to received fault status information.

6. The system of claim 1, wherein each of the power supply voltage sequencer devices includes a finite state machine, wherein the finite state machine is implemented as logic circuitry.

7. The system of claim 1, including a graphical user interface (GUI) and a processor, wherein each of the power supply voltage sequencer devices includes a finite state machine, wherein the processor is configured to program device states of the finite state machine in the plurality of power supply voltage sequencer devices using information received using the GUI.

8. The system of claim 7, wherein the processor is configured to program power supply operating properties in the plurality of power supply voltage sequencer devices using information received using the GUI.

9. The system of claim 7, wherein the processor is configured to receive operating status information from the plurality of power supply voltage sequencer devices and display operating status of power supply voltage rails using the GUI.

10. The system of claim 1, wherein the bus is an inter-integrated circuit (I²C) bus.

11. An integrated circuit to control power supply activation, the integrated circuit comprising:
    control circuitry configured to activate and deactivate multiple power supplies;
    a bus interface to a multi-line inter-chip cascade bus; and
    logic circuitry configurable, using a message received via the bus interface, as a finite state machine to generate control signals to sequentially activate and deactivate the multiple power supplies.

12. The integrated circuit of claim 11, wherein the logic circuitry is configured to communicate state information of the finite state machine via the bus interface.

13. The integrated circuit of claim 11, including monitoring circuitry configured to monitor the operating status of the multiple power supplies and communicate operating status information via the bus interface.

14. The integrated circuit of claim 11, wherein the bus interface is an inter-integrated circuit (I²C) bus interface.

15. A non-transitory computer readable storage medium including instructions that, when performed by processing circuitry of a computing device, cause the computing device to perform acts comprising:
    implementing a graphical user interface (GUI) on the computing device;
    receiving power supply voltage sequencer information via the GUI; and
    configuring, using the power supply voltage sequencer information, a plurality of power supply voltage sequencer devices to coordinate activation of a plurality of power supplies in a specified sequence, wherein a power supply provides a supply voltage rail to a voltage domain of an electronic system, and wherein a power supply voltage sequencer controls activation of more than one power supply.

16. The non-transitory computer readable storage medium of claim 15, including instructions that cause the processing circuitry to:
    configure a state machine in each of the power supply voltage sequencer devices, wherein a power supply voltage sequencer device sequentially activates and deactivates power supplies to which it is connected according to the configured state machine; and
    configure a power supply voltage sequencer device as a master device and one or more other power supply voltage sequencer devices as slave devices, wherein the master device is configured to broadcast a device state to the one or more slave devices to place all of the voltage sequencer devices in the same device state.

17. The non-transitory computer readable storage medium of claim 15, including instructions that cause the processing circuitry to: configure a state machine in each of the power supply voltage sequencer devices, wherein a power supply voltage sequencer device sequentially activates and deactivates power supplies to which it is connected according to the configured state machine, wherein only one voltage sequencer device sequences through device states at a time and communicates status of the sequencing to the other power supply voltage sequencer devices.

18. The non-transitory computer readable storage medium of claim 15, including instructions that cause the processing circuitry to receive power supply operating properties via the GUI and program the plurality of power supply voltage sequencer devices using the received power supply operating properties.

19. The non-transitory computer readable storage medium of claim 15, including instructions that cause the processing circuitry to receive operating status information from the plurality of power supply voltage sequencer devices and display operating status of power supply voltage rails using the GUI.

20. The non-transitory computer readable storage medium of claim 15, including instructions that cause the processing circuitry to send configuration information to a power supply voltage sequencer device and receive operating status information from the power supply voltage sequencer device according to an inter-integrated circuit ($I^2C$) bus protocol.

* * * * *